United States Patent [19]
Williams

[11] Patent Number: 5,774,704
[45] Date of Patent: Jun. 30, 1998

[54] APPARATUS AND METHOD FOR DYNAMIC CENTRAL PROCESSING UNIT CLOCK ADJUSTMENT

[75] Inventor: Ian Michael Williams, Sunnyvale, Calif.

[73] Assignee: Silicon Graphics, Inc., Mountain View, Calif.

[21] Appl. No.: 688,501

[22] Filed: Jul. 30, 1996

[51] Int. Cl.$^6$ ................................................ G06F 1/08
[52] U.S. Cl. ............................................................ 395/556
[58] Field of Search ............................................. 395/556

[56] References Cited

U.S. PATENT DOCUMENTS

| | | | |
|---|---|---|---|
| 4,677,433 | 6/1987 | Catlin et al. | 340/825.2 |
| 5,142,684 | 8/1992 | Perry et al. | 395/750 |
| 5,163,146 | 11/1992 | Antanaitis, Jr. et al. | 395/550 |
| 5,287,292 | 2/1994 | Kenny et al. | 364/550 |
| 5,291,529 | 3/1994 | Crook et al. | 375/109 |
| 5,301,306 | 4/1994 | Plog | 395/550 |
| 5,319,771 | 6/1994 | Takeda | 395/550 |
| 5,319,772 | 6/1994 | Hwang | 395/550 |
| 5,325,516 | 6/1994 | Blomgren et al. | 395/550 |
| 5,381,543 | 1/1995 | Blomgren et al. | 395/550 |
| 5,392,435 | 2/1995 | Masui et al. | 395/725 |
| 5,408,639 | 4/1995 | Gulick et al. | 395/550 |
| 5,416,434 | 5/1995 | Kootstra et al. | 327/113 |
| 5,420,865 | 5/1995 | Swanbery | 370/103 |
| 5,428,746 | 6/1995 | Dalrymple | 395/275 |
| 5,442,774 | 8/1995 | Pickup et al. | 395/550 |
| 5,450,574 | 9/1995 | Madter et al. | 395/550 |
| 5,451,892 | 9/1995 | Bailey | 327/113 |
| 5,455,931 | 10/1995 | Camporese et al. | 395/550 |
| 5,469,561 | 11/1995 | Takeda | 395/550 |
| 5,487,092 | 1/1996 | Finney et al. | 375/354 |
| 5,488,715 | 1/1996 | Lelm et al. | 395/550 |
| 5,490,059 | 2/1996 | Mahalingaiah | 364/166 |
| 5,491,814 | 2/1996 | Yee et al. | 395/550 |
| 5,506,981 | 4/1996 | Madter | 395/550 |
| 5,535,377 | 7/1996 | Parks | 395/550 |
| 5,537,581 | 7/1996 | Conary et al. | 395/550 |
| 5,546,568 | 8/1996 | Bland et al. | 395/550 |
| 5,561,792 | 10/1996 | Ganapathy | 395/550 |
| 5,563,928 | 10/1996 | Rostoker et al. | 377/20 |
| 5,579,353 | 11/1996 | Parmenter et al. | 375/376 |
| 5,586,270 | 12/1996 | Rotier et al. | 395/282 |

*Primary Examiner*—Thomas M. Heckler
*Attorney, Agent, or Firm*—Wagner, Murabito & Hao

[57] ABSTRACT

In a computer system having a cpu, a device for dynamic cpu clock adjustment. The device is comprised of a clock pulse generator for generating a clock frequency. The clock frequency is coupled to the cpu and is used by the cpu to synchronize and pace its internal operations. The clock frequency generated by the generator is variable over a range. A controller is coupled to the clock pulse generator, for adjusting the clock frequency from the clock pulse generator over the range. The controller interfaces with the computer system through an interface coupled to the controller. Through the interface, the controller communicates with the computer system or cpu and determines a load placed on the cpu. The controller adjusts the clock frequency generated by the clock pulse generator such that the clock frequency increases when the load on the cpu increases and the clock frequency decreases when the load on the cpu decreases, dynamically adjusting the clock frequency in response to the load on the cpu.

28 Claims, 6 Drawing Sheets

APPARATUS AND METHOD FOR DYNAMIC CENTRAL PROCESSING UNIT CLOCK ADJUSTMENT

FIELD OF THE INVENTION

The field of the present invention pertains to central processing unit (cpu) clocks. More particularly, the present invention relates to an apparatus and method to dynamically adjust cpu clock frequency in response to cpu application loading.

BACKGROUND OF THE INVENTION

Computers are being used today to perform a wide variety of tasks. Many different areas of business, industry, government, education, entertainment, and most recently, the home, are tapping into the enormous and rapidly growing list of applications developed for today's increasingly powerful computer devices. Computers have also become a key technology for communicating ideas, data, and trends between and among business professionals. These devices have become so useful and ubiquitous, it would be hard to imagine today's society functioning without them.

Computers operate by executing programs, or a series of instructions, stored in its memory. These programs, and their series of instructions, are collectively referred to as software. Software is what makes the computer devices function and perform useful tasks. The utility of the computer device often hinges upon the speed and efficiency with which the computer executes the software program. As programs have become larger and more complex, the execution speed of the computer becomes one of the dominant factors in the utility of the computer device.

Execution speed of a computer device depends on the performance characteristics of the individual components comprising the computer device (i.e. the central processing unit, bus system, IO system, and the like). Of these components, the cpu, which maybe integrated with necessary additional circuits (for performing memory access, input output functions, and the like) onto a single chip called a microprocessor, and the speed at which the cpu executes software instructions, is often most critical to overall execution speed of the computer device. Generally for all cpu designs, the faster the individual instructions comprising a software program are executed, the faster the overall speed of the computer device using that cpu.

One of the methods used by designers to increase software program execution speed is to increase the cpu "clock speed." Clock speed refers to the rate at which the cpu steps its way through the individual software instructions. With many cpu designs, one or more instructions are executed per clock cycle. Increasing the number of clock cycles per second directly increases the number of instructions executed per second. Modern cpu's often are "clocked" in excess of 200 MHz and execute many millions of instructions per second (mips) accordingly. Software applications which run on computer devices using such cpu's perform much better. Thus, computer designers set the cpu clock frequency as fast as possible.

Cpu clock frequency, however, cannot be increased without limit. If a cpu is clocked at too high a rate, problems such as over heating and excessive power consumption occur. An over heated cpu will not perform correctly. Over heating leads to computational errors, unpredictable cpu behavior, or even destruction of the cpu. A cpu which consumes excessive power is also not suited to mobile computer device applications, where power supply is limited (i.e. from batteries). Battery power of the mobile device is quickly exhausted. Complex software applications, programs (or even portions of applications/programs) which place a heavy computational load on the cpu, very much need the execution speed of a high clock frequency cpu to perform adequately. As such, many modern software applications become virtually unusable on devices incorporating a slow, low clock frequency cpu. A small or relatively simple software program (or portions of applications/programs), however, generate a small computational load on the cpu and are just as effective on a slow device as on a fast device. A fast cpu running such a program, or portion of a program, confers no user perceptible performance benefit to offset excessive heat generation and other associated problems that may apply, such as excessive power consumption. This is because the cpu may in fact be idle for large periods of time while awaiting certain activities, such as user input, to be completed.

Thus, what is needed is a device which overcomes the over heating problems of high clock frequency cpu's. What is needed is an apparatus which will solve other associated problems that may arise with high clock frequency, such as excessive power consumption. Many software applications typically demand very fast cpu's in order to deliver their best overall performance to the user. Thus, what is needed is a method and apparatus which runs software programs or portions of programs, at peak performance for the user, yet does not lead to over heating of the cpu or other problems that may arise from running cpu's at high clock frequencies, such as excessive power consumption.

SUMMARY OF THE INVENTION

In a computer system having a cpu, the present invention pertains to a device for dynamic cpu clock adjustment. The device is comprised of a clock pulse generator for generating a clock frequency. The clock frequency is coupled to the cpu and is used by the cpu to synchronize and pace its internal operations. The clock frequency generated by the generator is variable over a range. A controller is coupled to the clock pulse generator, for adjusting the clock frequency from the clock pulse generator over the range. The controller interfaces with the computer system through a system interface coupled to the controller. Through the system interface, the controller communicates with the cpu and the computer system and determines a load placed on the cpu. The controller adjusts the clock frequency generated by the clock pulse generator such that the clock frequency increases when the load on the cpu increases and the clock frequency decreases when the load on the cpu decreases, dynamically adjusting the clock frequency in response to the load on the cpu.

The dynamic adjustment of the clock frequency in response to load overcomes the over heating problems of high clock frequency cpu's. Dynamic adjustment of the clock frequency by the present invention also solves other problems that may occur with high clock frequency cpu's such as excessive power consumption. Large, complex software applications, or portions thereof, are run at maximum speed in order to deliver the best performance to the user. However, the clock frequency is reduced when peak performance is not required, to avoid over heating of the cpu, or other associated problems such as excessive power consumption.

BRIEF DESCRIPTION OF THE DRAWINGS

The present invention is illustrated by way of example and not by way of limitation, in the figures of the accom

DETAILED DESCRIPTION OF THE INVENTION

A device and method for dynamic cpu clock adjustment is disclosed. In the following description, for the purposes of explanation, numerous specific details are set forth in order to provide a thorough understanding of the present invention. It will be obvious, however, to one skilled in the art that the present invention may be practiced without these specific details. In other instances, well-known structures, devices, and processes are shown in block diagram form in order to avoid unnecessarily obscuring the present invention.

The dynamic cpu clock adjustment device of the present invention solves the over heating problems of high clock frequency cpu's. The device of the present invention determines a load placed on the cpu by a software program, or a computationally intensive portion of a software program. The device adjusts the clock frequency coupled to the cpu such that the clock frequency dynamically increases when the load on the cpu increases and the clock frequency dynamically decreases when the load on the cpu decreases, thereby adjusting the clock frequency in response to the load on the cpu. Many software applications demand very fast cpu's in order to deliver their best performance to the user. The present invention increases the clock frequency of the cpu and runs these software programs at peak performance for the user. When the load placed on the cpu decreases, the present invention decreases the clock frequency of the cpu and avoids over heating or other problems that may arise, such as excessive power consumption.

Figure 1:
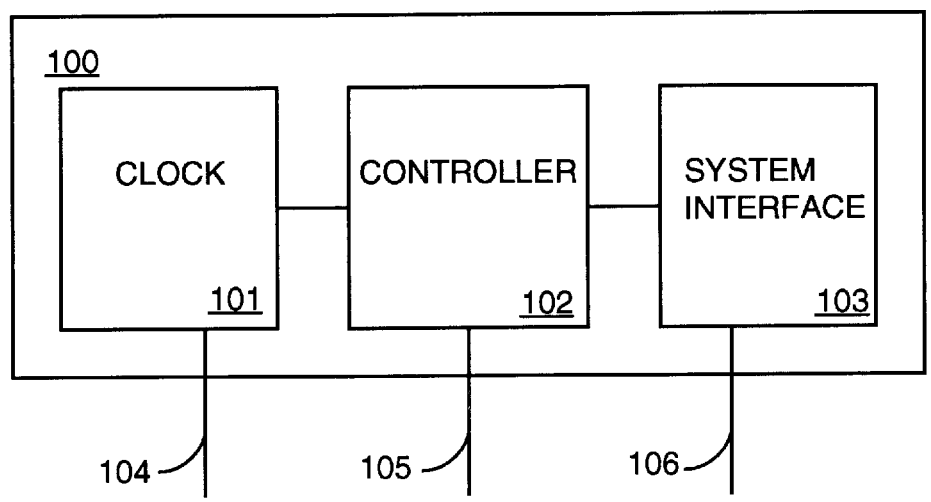
- FIG. 1 shows a diagram of a cpu clock adjustment device in accordance with the present invention.

With reference now to FIG. 1, a block diagram of the cpu clock adjustment device is shown. The device 100 of the present invention is comprised of a clock pulse generator 101 for generating a clock frequency. The clock frequency generated by the generator is variable over a broad frequency range. The clock frequency is coupled to a clock frequency output line 104. Clock frequency output line 104 is coupled to a cpu (not shown) and is used by the cpu to synchronize and pace its internal operations. A controller 102 is coupled to the clock pulse generator, for adjusting the clock frequency from the clock pulse generator over the frequency range. The controller is adapted to accept a number of different algorithms for determining the clock frequency. The goal of the controller is to run the cpu as fast as possible when the cpu load is high and slow the cpu when peak speed is not necessary. The controller adjusts the clock frequency generated by the clock pulse generator such that the clock frequency increases when the load on the cpu increases and the clock frequency decreases when the load on the cpu decreases. An interface 103 is coupled to the controller 102. The interface 103 is coupled to an interface line 106. The interface 103 transmits a signal describing the load on the cpu to the controller 102. The controller sets the clock frequency in response to the cpu load described by this signal. In this manner, the device 100 dynamically adjusts the clock frequency in response to the load on the cpu.

Figure 2:
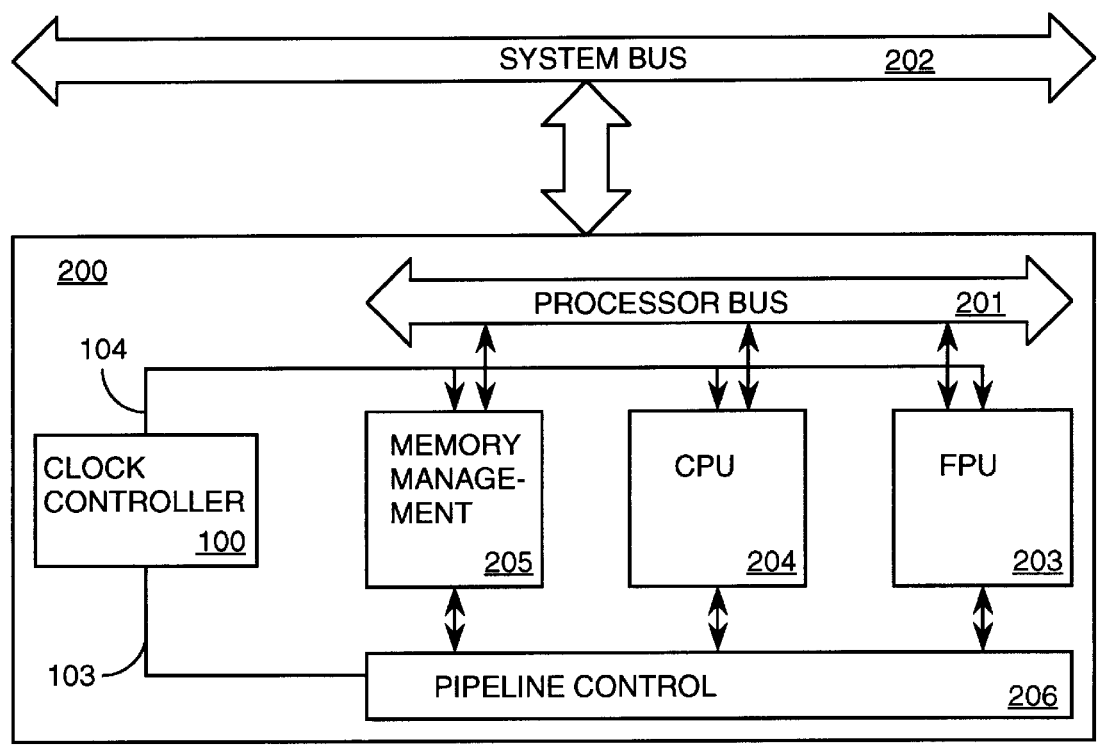
FIG. 2 shows a diagram of a microprocessor having an integrated cpu clock adjustment device of the present invention.

With reference now to FIG. 2, a block diagram of the cpu clock adjustment device integrated within a microprocessor is shown. In this embodiment, the cpu clock adjustment device of the present invention 100 is integrated into the die of the microprocessor 200 itself. The exemplary microprocessor 200 includes a memory management unit (mmu) 205, a central processing unit (cpu) 204, and a floating point unit (fpu) 203. Software instructions and data are received and dispatched across a processor bus 201. The software instructions and data are processed by the mmu 205, cpu 204, and fpu 203, with a pipeline control 206 coordinating their operation and timing. The processor bus 201 is coupled to a system bus 202. The system bus is in turn coupled to the rest of the computer system (not shown) in order to communicate with the microprocessor 200. The device of the present invention 100 is integrated into the same die with the microprocessor 200. In the present embodiment, the system interface line 106 is coupled to the pipeline control 206 of the microprocessor 200. The clock frequency line 104 is coupled to the mmu 205, the cpu 204, and the fpu 203, and communicates a clock frequency. The clock frequency serves as the master clock signal upon which the operation and synchronization of the components of the microprocessor 200 are derived. The device of the present invention 100 determines a load on the microprocessor via the activity detected in pipeline control 206 through the system interface line 106. In response to the determined load, the device 100 sets the clock frequency. When the load detected increases, the device 100 increases the clock frequency. When the load decreases the device 100 decreases the clock frequency. It should be appreciated that the components and layout of the microprocessor 200 may vary with particular embodiments. The exemplary microprocessor 200 in accordance with the present invention includes a mmu 205, cpu 204, fpu 203, and the like, as shown in FIG. 2. In this embodiment, the clock frequency line 104 of cpu clock adjustment device 200 is coupled to other units in addition to the cpu 204, in order to properly synchronize the operation of the microprocessor 200. Given this, the cpu clock adjustment device 100 of the present invention may be implemented in a number of microprocessor and system configurations, including "cpu only" integrated circuits which do not have a mmu, fpu, and the like, integrated into the same die.

Figure 3:
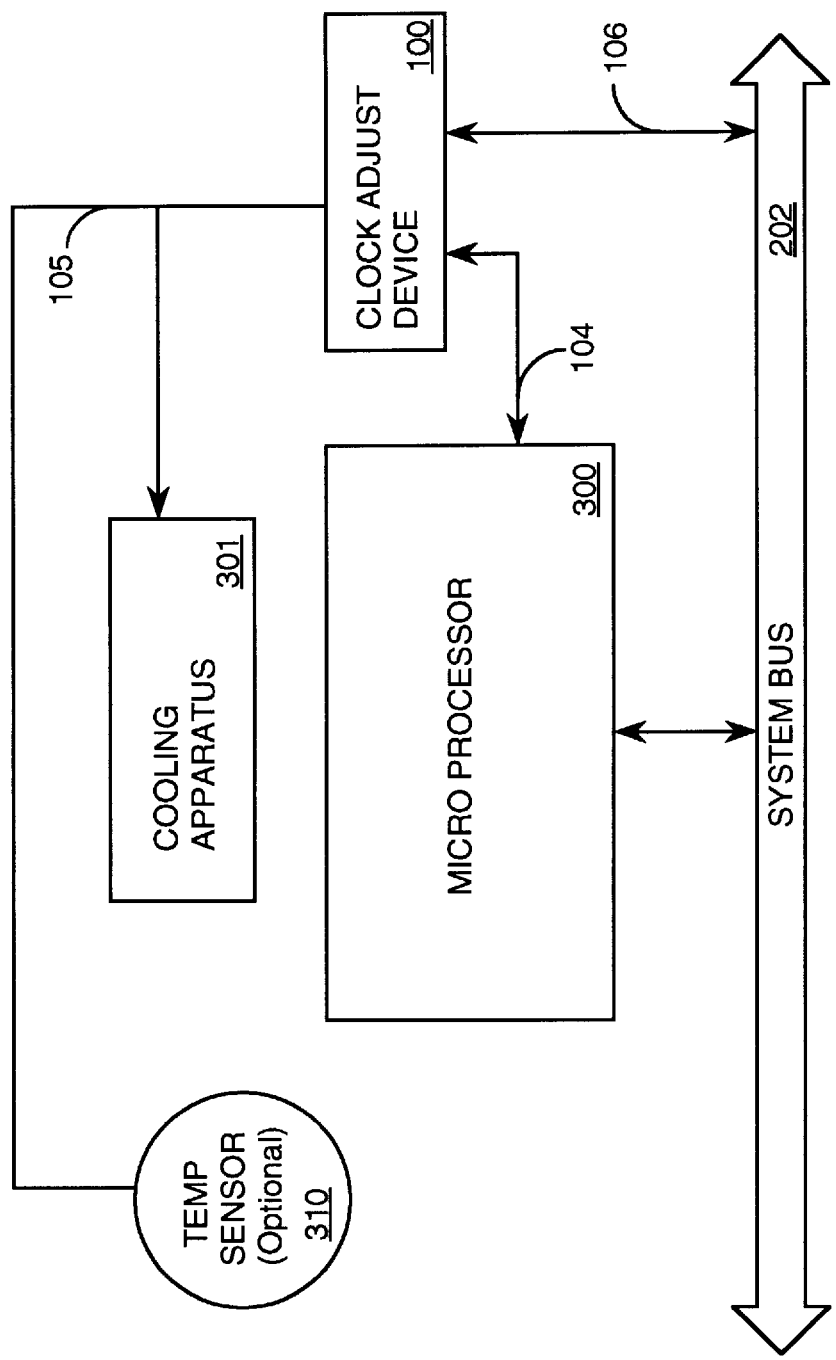
FIG. 3 shows a diagram of a microprocessor having an external cpu clock adjustment device of the present invention.

With reference now to FIG. 3, a block diagram of an externally configured cpu clock adjustment device in accordance with the present invention is shown. In this embodiment, the clock adjustment device 100 is located externally to a microprocessor 300. The device 100 is coupled to the microprocessor 300 through the clock frequency line 104. The device 100 is coupled to the system bus 202 through the system interface line 106. Additionally, the device is coupled to a cooling apparatus 301 through the control line 105. The microprocessor 300 is coupled to the rest of the computer system (not shown) through the system bus 202. As described above, the microprocessor 300 receives a clock frequency through the clock frequency line 104. In this embodiment, the clock frequency coupled through the clock frequency line 104 serves as a master clock signal upon which all microprocessor 306 internal clock signals are generated. The device 100 detects a microprocessor load through the system interface line 106. The device 100 varies the clock frequency in response to the detected microprocessor load as described above. The device 100 may detect, in the alternative, a load on the cpu of microprocessor 300 only and adjust the clock frequency in response to cpu load, or, a load on both the cpu and other portions of microprocessor 300 and adjust the clock frequency in response to the combination. In this embodiment, the device 100 also controls an amount of cooling applied to the microprocessor 300 by the cooling apparatus 301 through control signals sent over the control line 105. The device 100 increases the amount of cooling when the load detected increases and decreases the amount of cooling when the load decreases. In this manner the amount of cooling varies depending on the load on the processor. In so doing, the total time the microprocessor 300 may be run at a maximum clock frequency is increased, the excess heat being carried away by the increased amount of cooling. Power consumption by the cooling apparatus 301, however, may be reduced by reducing the amount of cooling delivered to the microprocessor 300 when the microprocessor 300 is running at reduced loads.

The cooling apparatus 301 may be comprised of a number of cooling devices well known in the prior art (e.g. a heat sink incorporating a fan mounted directly onto the microprocessor). The cooling apparatus 301 merely delivers a varying amount of cooling to the microprocessor 300 in response to the control signals received over the control line 105 from the present invention. In this manner the microprocessor 300 using the present invention may be "over clocked"(run at higher than continuously sustainable speeds) for periods of time when maximum performance is desired and subsequently cooled by the device 100 of the present invention when the load is reduced and the need for maximum performance has past. Thus, a computer system including the present invention will appear faster than a standard computer system of the prior art.

The present invention may also include an optional temperature sensor 310 coupled to the control line 105. The temperature sensor 310 would send heat information about the microprocessor 300 to the clock adjust device 100. The clock adjust device 100 uses this information as an additional input to determine the load on the microprocessor 300 or to determine whether the microprocessor 300 is working "too hard"(e.g. being over clocked) and has exceeded its thermal limit. The heat information is then used to control the amount of cooling or the clock frequency. It also acts as a safety mechanism to inform the clock adjust device 100 of dangerous "over temperature" conditions.

Figure 4:
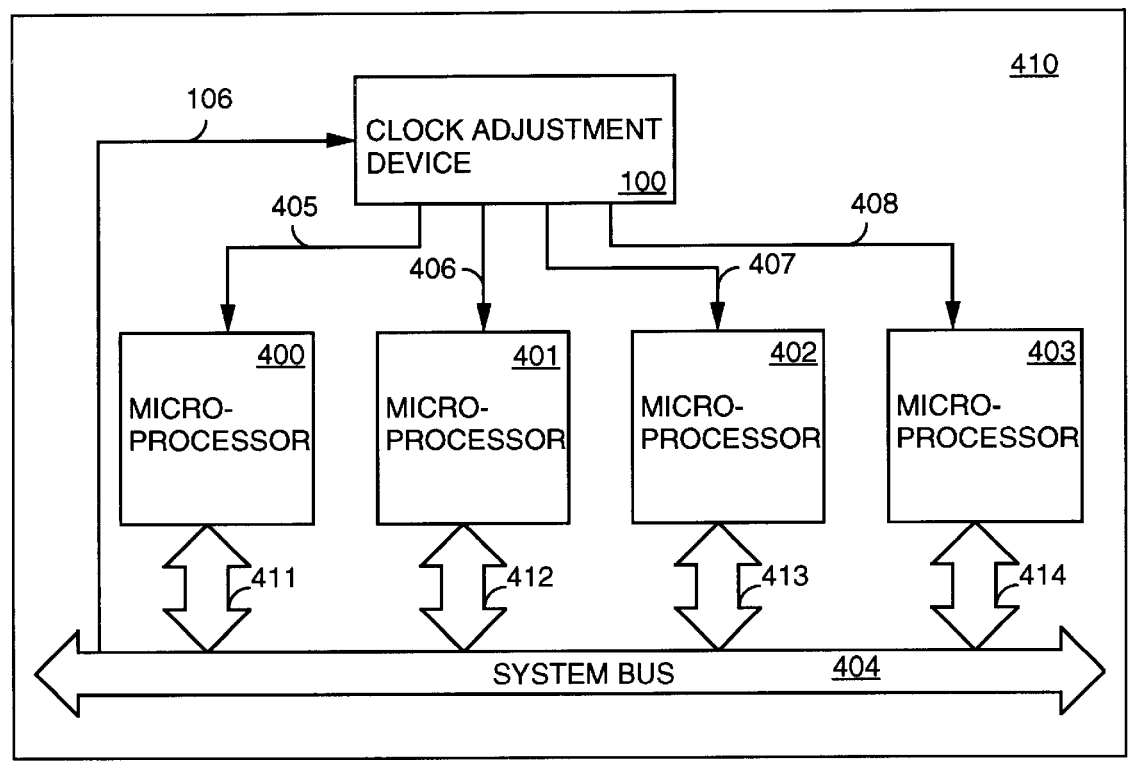
FIG. 4 shows a diagram of multi-microprocessor computer system having a cpu clock adjustment device of the present invention.

With reference now to FIG. 4, a multiprocessor computer system including the cpu clock adjusting device of the present invention is shown. The multiprocessor computer system 410 includes four microprocessors, 400, 401, 402, and 403, although the present invention can be adapted to control any number of microprocessors. Each of the microprocessors 400, 401, 402, and 403, are coupled to a system bus 404 and symmetrically divide a processing load placed upon the system 410 among themselves, thus providing for a more powerful computer system than a single microprocessor system. In this embodiment, the clock adjusting device of the present invention 100 is coupled to the microprocessors 400, 401, 402, 403, through separate and individual clock frequency lines 405, 406, 407, and 408. The system interface line 106 is coupled to the system bus 404.

The clock adjusting device detects a microprocessor load through the system interface line 106 and adjusts the clock frequency of each microprocessor 400, 401, 402, and 403 accordingly, in the manner described above.

In this embodiment, the microprocessor load is derived from the system bus 404 through the system interface line 106, and represents a total system load on the processors 400, 401, 402, and 403. The device of the present invention can be adapted to detect a microprocessor load for each of the microprocessors 400, 401, 402, 403, individually by coupling an individual system interface line to the system bus inputs 411, 412, 413, 414, respectively (not shown). The clock frequency for each of processors 400, 401, 402, and 403 would then be adjusted with respect to their individual loads.

The device of the present invention can also be adapted to control a cooling apparatus for the microprocessors 400, 401, 402, and 403 in the manner described above. As in the case of individually adjusted clock frequencies, a separate cooling apparatus can be provided for each of microprocessors 400, 401, 402, and 403, and an individual amount of cooling can be controlled by the device of the present invention 100.

Figure 5A:
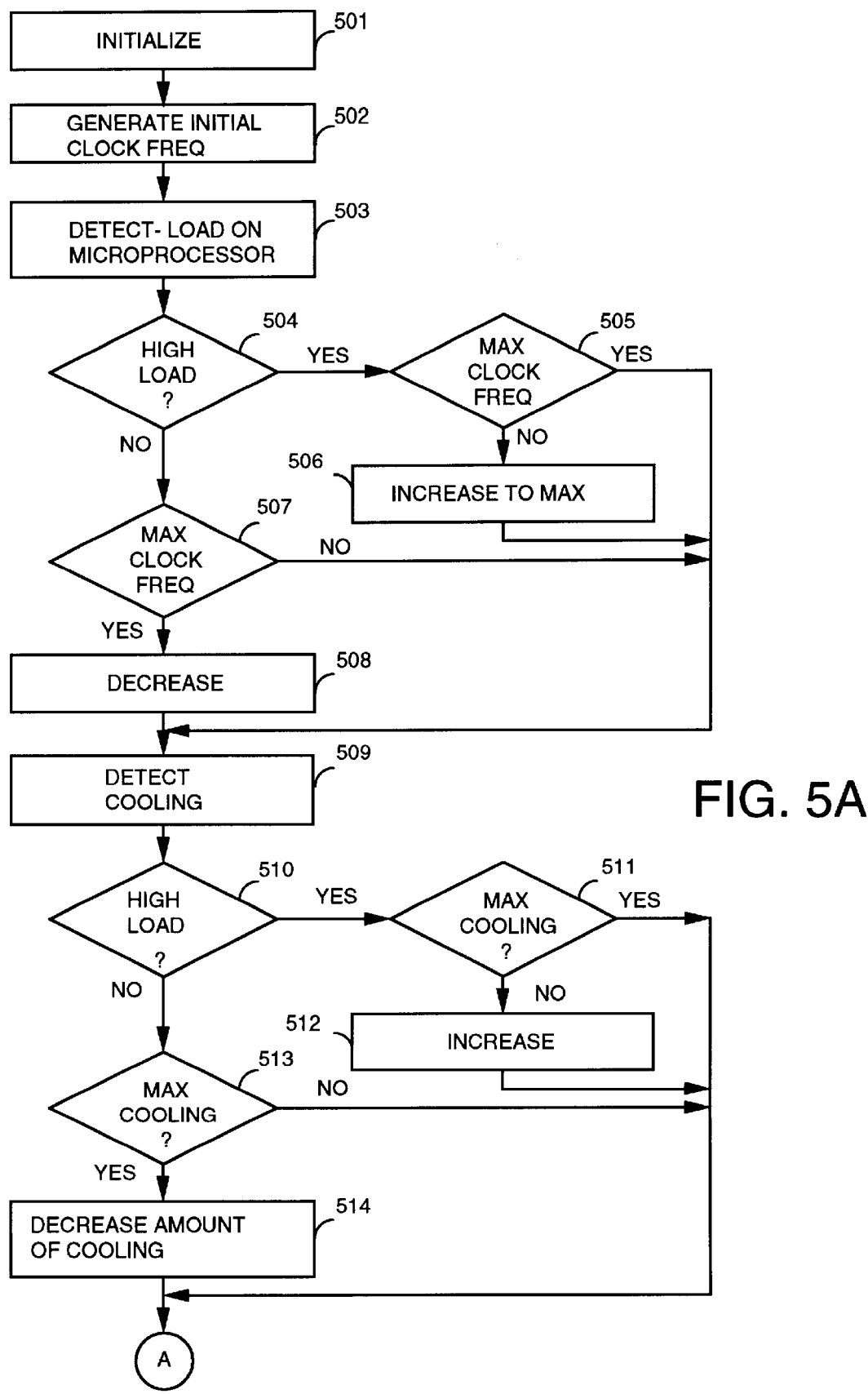
FIG. 5A shows a first portion of a flow chart of the process employed by the cpu clock adjustment device of the present invention.
Figure 5B:
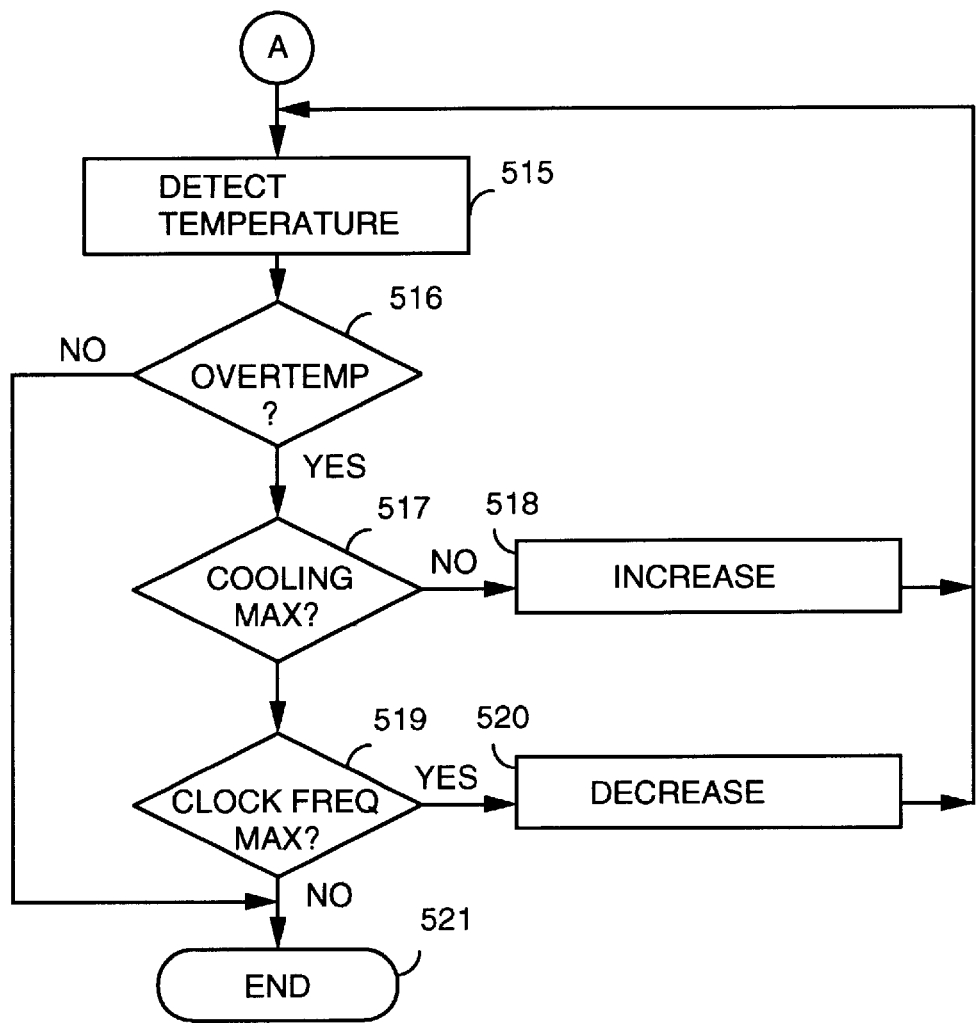
FIG. 5B shows a remaining portion of the flow chart of the process employed by the cpu clock adjustment device of the present invention.

With reference now to FIG. 5A and FIG. 5B, a flow chart of an exemplary method of the present invention is shown. FIG. 5A is the first portion of the flow chart and FIG. 5B is the remaining portion of the flow chart. The flow chart is for the cpu clock adjustment device embodiment shown in FIG. 3. It should be appreciated that the flow chart of FIG. 6A and FIG. 5B may change with differing embodiments of the present invention. The present invention follows the method 500 in adjusting the clock frequency and the amount of cooling. In step 501, the clock adjustment device is initialized. In this step the device can be configured for any microprocessor specific information or computer system specific information (e.g. the number of processors in the system, the initial clock frequency, microprocessor thermal limits, and the like). In step 502, the device generates the initial clock frequency. The computer system functions nominally, using the clock frequency generated in step 502 as the master clock frequency for all its operations. In step 503, the device detects a load on the microprocessor. In step 504, the device determines whether the detected load is a high load or a low load. If the detected load is a high load, the device checks the clock frequency, step 505, and increases it to maximum if not already at maximum, step 506. If the microprocessor is not under high load, the device decreases the clock frequency if the clock frequency is at maximum, in steps 507 and 508. In step 509, the device detects an amount of cooling delivered from a cooling apparatus. The device can be configured to set any standard amount of cooling upon start up. In this embodiment, the device sets a normal amount of cooling, as opposed to a maximum amount of cooling, initially. In step 510, the device detects the load on the microprocessor. If the load is high, the amount of cooling is set to maximum, if not already at maximum, in steps 511, 512. If the load is not high and the amount of cooling is at maximum, the amount of cooling is decreased, in steps 513, 514. In step 515, a temperature of the microprocessor is detected. The device then determines whether the temperature represents an over temperature condition, step 516. If an over temperature condition is detected, in step 516, the amount of cooling is increased, if not already maximum, in steps 517, 518. If the amount of cooling is maximum, and the clock frequency is maximum, the clock frequency is reduced, in steps 519, 520. At the conclusion of step 519, or, if no over temperature condition is detected in step 516, the process ends, step 521, and starts over again with step 503, detect a load on the microprocessor. From step 503, the process repeats as described above, as long as the computer system is in operation.

The present invention, an apparatus and method for dynamic microprocessor clock adjustment is thus described. While the present invention has been described in particular embodiments, it should be appreciated that the present invention should not be construed as limited by such embodiments, but rather construed according to the below claims.

What is claimed is:

1. In a computer system having a central processing unit (cpu), a cpu clock adjustment device, comprising:
   a clock pulse generator coupled to the cpu for generating a clock frequency, wherein the clock frequency is variable over a range;
   a controller coupled to the clock pulse generator for adjusting the clock frequency from the clock pulse generator over the range;
   an interface coupled to the controller, the interface adapted to detect a load on the cpu, the interface for communicating the load on the cpu to the controller, such that the controller adjusts the clock frequency of the clock pulse generator in response to the load on the cpu; and
   a cooling device coupled to the controller for delivering an amount of cooling to the cpu, the amount of cooling dynamically adjusted depending upon the load placed on the cpu.

2. The clock adjustment device of claim 1 wherein the clock frequency from the clock pulse generator is dynamically adjusted by the controller depending upon the load placed on the cpu by a software program or a portion of a software program.

3. The clock adjustment device of claim 2 wherein the clock frequency coupled to the cpu is reduced when the load placed on the cpu by the software program is reduced and the clock frequency coupled to the cpu is increased when the load placed on the cpu is increased.

4. The clock adjustment device of claim 1, wherein the controller is adapted to dynamically control the cooling device to deliver the amount of cooling to the cpu.

5. The clock adjustment device of claim 4 wherein the amount of cooling delivered to the cpu is adjusted depending upon a load placed on the cpu, the amount of cooling increased when the load placed on the cpu increases.

6. The clock adjustment device of claim 1 wherein the controller adjusts the clock frequency coupled to a plurality of cpu's in response to a load on the plurality of cpu's.

7. The clock adjustment device of claim 6 wherein the controller adjusts the clock frequency coupled to the plurality of cpu's on either an individual basis, or, a collective basis.

8. The clock adjustment device of claim 1 further comprising a temperature sensor coupled to the controller, the temperature sensor coupled to the cpu, for sending a temperature of the cpu to the controller, wherein the controller adjusts the clock frequency depending upon the temperature of the cpu.

9. In a microprocessor based computer system for running software, a central processing unit (cpu) clock adjustment device, comprising:
   a clock pulse generator coupled to the cpu for generating a clock frequency, wherein the clock frequency is variable over a range;
   a controller coupled to the clock pulse generator for adjusting the clock frequency from the clock pulse generator over the range, the controller adapted to detect a load on the cpu, wherein the controller adjusts the clock frequency of the clock pulse generator in response to the load on the cpu;
   a temperature sensor coupled to the controller for sending a temperature of the cpu to the controller, wherein the controller adjusts the clock frequency depending upon th e temperature of the cpu; and
   a cooling device coupled to the controller for delivering an amount of cooling to the cpu, the amount of cooling dynamically adjusted depending upon the load placed on the cpu.

10. The clock adjustment device of claim 9 wherein the clock frequency from the clock pulse generator is dynamically adjusted by the controller depending upon the load placed on the cpu by software.

11. The clock adjustment device of claim 10 wherein the clock frequency coupled to the cpu is reduced when the load placed on the cpu by the software is reduced and the clock frequency coupled to the cpu is increased when the load placed on the cpu is increased.

12. The clock adjustment device of claim 9 wherein the controller is adapted to dynamically control the cooling device to deliver the amount of cooling.

13. The clock adjustment device of claim 12 wherein the amount of cooling delivered to the cpu is adjusted depending upon a load placed on the cpu, the amount of cooling increased when the load placed on the cpu increases.

14. The clock adjustment device of claim 9 wherein the controller adjusts the clock frequency coupled to a plurality of cpu's in response to a load on the plurality of cpu's.

15. The clock adjustment device of claim 14 wherein the controller adjusts the clock frequency coupled to the plurality of cpu's on either an individual basis, or, a collective basis.

16. In a computer system having a central processing unit (cpu), a method for adjusting a clock frequency coupled to the cpu, comprising the steps of:
   generating the clock frequency, wherein the clock frequency is used by the cpu to synchronize internal operations of the cpu;
   detecting a load on the cpu, wherein the load originates from software executing on the cpu;
   increasing the clock frequency when the load placed on the cpu exceeds a threshold;
   decreasing the clock frequency when the load placed on the cpu does not exceed the threshold, such that the clock frequency is dynamically adjusted in response to the load placed on the cpu by software;
   setting an amount of cooling delivered to the cpu;
   increasing the amount of cooling delivered to the cpu when the load placed on the cpu by software exceeds the threshold;
   decreasing the amount of cooling delivered to the cpu when the load placed on the cpu by software does not exceed the threshold, such that the amount of cooling is dynamically adjusted in response to the load placed on the cpu.

17. The method of claim 16, further comprising the steps of:
   determining whether an over temperature condition exists in the cpu;
   decreasing the clock frequency if there is an over temperature condition in the cpu.

18. The method of claim 16, further comprising the steps of:

setting an amount of cooling delivered to the cpu;

increasing the amount of cooling delivered to the cpu when the load placed on the cpu by software exceeds the threshold;

decreasing the amount of cooling delivered to the cpu when the load placed on the cpu by software does not exceed the threshold, such that the amount of cooling is dynamically adjusted in response to the load placed on the cpu.

19. The method of claim 18, further comprising the steps of:

determining whether an over temperature condition exists in the cpu;

increasing the amount of cooling if there is an over temperature condition in the cpu.

20. In a computer system having a microprocessor, a microprocessor clock adjustment device, comprising:

a clock pulse generator coupled to the microprocessor for generating a clock frequency, wherein the clock frequency is variable over a range;

a controller coupled to the clock pulse generator for adjusting the clock frequency from the clock pulse generator over the range;

an interface coupled to the controller, the interface adapted to detect a load on the microprocessor, wherein the load is determined by monitoring a pipeline control within the microprocessor, the interface for communicating the load on the microprocessor to the controller, such that the controller adjusts the clock frequency of the clock pulse generator in response to the load on the microprocessor.

21. The clock adjustment device of claim 20 wherein the pipeline control is coupled to a floating point unit, a memory management unit, and a central processing unit to coordinate the operation of the microprocessor, the load determined by monitoring the activity of the pipeline control.

22. The clock adjustment device of claim 20 wherein the clock frequency from the clock pulse generator is dynamically adjusted by the controller depending upon the load placed on the microprocessor by a software program or a portion of a software program.

23. The clock adjustment device of claim 22 wherein the clock frequency coupled to the microprocessor is reduced when the load placed on the microprocessor by the software program is reduced and the clock frequency coupled to the microprocessor is increased when the load placed on the microprocessor is increased.

24. The clock adjustment device of claim 20 further comprising a cooling device coupled to the controller for delivering an amount of cooling to the microprocessor, the amount of cooling dynamically adjusted depending upon the load placed on the microprocessor.

25. The clock adjustment device of claim 24 wherein the amount of cooling delivered to the microprocessor is adjusted depending upon a load placed on the microprocessor, the amount of cooling increased when the load placed on the microprocessor increases.

26. The clock adjustment device of claim 20 wherein the controller adjusts the clock frequency coupled to a plurality of microprocessor's in response to a load on the plurality of microprocessor's.

27. The clock adjustment device of claim 26 wherein the controller adjusts the clock frequency coupled to the plurality of microprocessor's on either an individual basis, or, a collective basis.

28. The clock adjustment device of claim 20 further comprising a temperature sensor coupled to the controller, the temperature sensor coupled to the microprocessor, for sending a temperature of the microprocessor to the controller, wherein the controller adjusts the clock frequency depending upon the temperature of the microprocessor.

* * * * *

UNITED STATES PATENT AND TRADEMARK OFFICE
CERTIFICATE OF CORRECTION

PATENT NO : 5,774,704
DATED : June 30, 1998
INVENTOR(S): Ian Michael Williams

It is certified that error appears in the above-identified patent and that said Letters Patent is hereby corrected as shown below:

On the title page, Item [22] Issued Patent 5,774,704, the filed date is incorrect. The correct filed date is July 29, 1996.

Signed and Sealed this

Twenty-second Day of June, 1999

Attest:

Q. TODD DICKINSON

Attesting Officer

Acting Commissioner of Patents and Trademarks